United States Patent
Doering et al.

(10) Patent No.: US 10,161,336 B2
(45) Date of Patent: Dec. 25, 2018

(54) SYSTEM AND METHOD FOR DETERMINING VALVE OPERATION

(71) Applicant: Ford Global Technologies, LLC, Dearborn, MI (US)

(72) Inventors: Jeffrey Allen Doering, Canton, MI (US); Chris Paul Glugla, Macomb, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1332 days.

(21) Appl. No.: 13/910,836

(22) Filed: Jun. 5, 2013

(65) Prior Publication Data

US 2014/0360477 A1  Dec. 11, 2014

(51) Int. Cl.
| F02D 41/00 | (2006.01) |
| F02D 41/14 | (2006.01) |
| F02D 41/22 | (2006.01) |
| F02D 37/02 | (2006.01) |
| F02P 5/00 | (2006.01) |
| F02P 9/00 | (2006.01) |

(52) U.S. Cl.
CPC ........... *F02D 41/144* (2013.01); *F02D 37/02* (2013.01); *F02D 41/0052* (2013.01); *F02D 41/0087* (2013.01); *F02D 41/221* (2013.01); *F02D 2041/001* (2013.01); *F02D 2250/22* (2013.01); *F02P 5/00* (2013.01); *F02P 9/00* (2013.01); *Y02T 10/47* (2013.01)

(58) Field of Classification Search
USPC ....... 123/673; 60/605.2, 272, 276, 281, 324, 60/39.52, 274, 278, 285, 286
See application file for complete search history.

(56) References Cited

U.S. PATENT DOCUMENTS

| 7,900,509 B2 | 3/2011 | Feldkamp et al. |
| 8,286,471 B2 | 10/2012 | Doering et al. |
| 9,157,390 B2 * | 10/2015 | Song .................. F02D 41/0072 |
| 2006/0243040 A1 * | 11/2006 | Reed ........................ F01L 9/04 |
| | | 73/114.79 |
| 2009/0013969 A1 * | 1/2009 | Winstead ............ F02D 13/0207 |
| | | 123/481 |
| 2010/0174468 A1 * | 7/2010 | Surnilla .................. F02D 41/18 |
| | | 701/103 |
| 2013/0268176 A1 * | 10/2013 | Song ................ F02M 35/10393 |
| | | 701/102 |

FOREIGN PATENT DOCUMENTS

CN     1424495 A     6/2003

OTHER PUBLICATIONS

State Intellectual Property Office of the People's Republic of China, Office Action and Search Report Issued in Application No. 201410247579.1, dated Nov. 28, 2017, 12 pages. (Submitted with Partial Translation).

* cited by examiner

*Primary Examiner* — Lindsay Low
*Assistant Examiner* — Ruben Picon-Feliciano
(74) *Attorney, Agent, or Firm* — Julia Voutyras; McCoy Russell LLP

(57) ABSTRACT

Systems and methods for determining operation of a cylinder deactivating/reactivating device are disclosed. In one example, degradation of the cylinder deactivating/reactivating device is based on intake manifold oxygen concentration.

20 Claims, 4 Drawing Sheets

SYSTEM AND METHOD FOR DETERMINING VALVE OPERATION

BACKGROUND AND SUMMARY

Cylinders of an engine may be selectively deactivated to conserve fuel. For example, four cylinders of an eight cylinder engine may be deactivated while at the same time the four remaining cylinders continue to operate. Deactivating four of eight cylinders increases the efficiency of the active cylinders while reducing engine pumping losses. One way to deactivate an engine cylinder is to cease fuel flow to the cylinder and hold a cylinder's intake and exhaust valves in a closed position during an engine cycle. The engine may continue to rotate without pumping air through the deactivated cylinder. The cylinder may be reactivated by injecting fuel to the cylinder and restarting opening and closing of the cylinder's intake and exhaust valves. However, it may be possible that a cylinder does not properly reactivate after it has been deactivated. For example, the cylinder's intake and/or exhaust valves may remain closed as the engine rotates. Consequently, the engine may not have its full rated power and engine emissions may degrade if the inactive cylinder is not detected.

The inventors herein have recognized that an engine's exhaust valves may remain closed over an engine cycle after the exhaust valves have been commanded to operate and have developed an engine operating method, comprising: commanding reactivation of a cylinder that is deactivated; and adjusting engine operation in response to an oxygen concentration in an engine intake manifold being less than a threshold oxygen concentration.

By recognizing that intake manifold oxygen concentration may be indicative of exhaust valve operation, it may be possible to adjust engine operation so that engine emission degradation may be reduced. For example, a position of an EGR valve may be adjusted to compensate for additional EGR that may enter the engine's intake valve via one or more cylinders having exhaust valves that remain closed when they are commanded to operate. Further, intake manifold oxygen concentration may a basis for distinguishing a portion of cylinders that were deactivated and operate as desired from a portion of cylinders that were deactivated and do not operate as is desired. In particular, intake manifold oxygen concentration may be evaluated when a fraction of deactivated cylinders is reactivated while the remaining deactivated cylinders remain inactive. If the intake manifold oxygen concentration is not reduced to less than a threshold oxygen concentration, it may be determined that the cylinders that were reactivated include exhaust valves that operate as desired. The cylinders having properly operating exhaust valves may be reactivated so as to provide and increased amount of engine torque as compared to when all deactivated cylinders remain in a deactivated state. The remaining portion of cylinders may remain deactivated so that internal EGR may be limited. In this way, the engine torque capacity may be increased without having to activate cylinders that include degraded exhaust valve operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
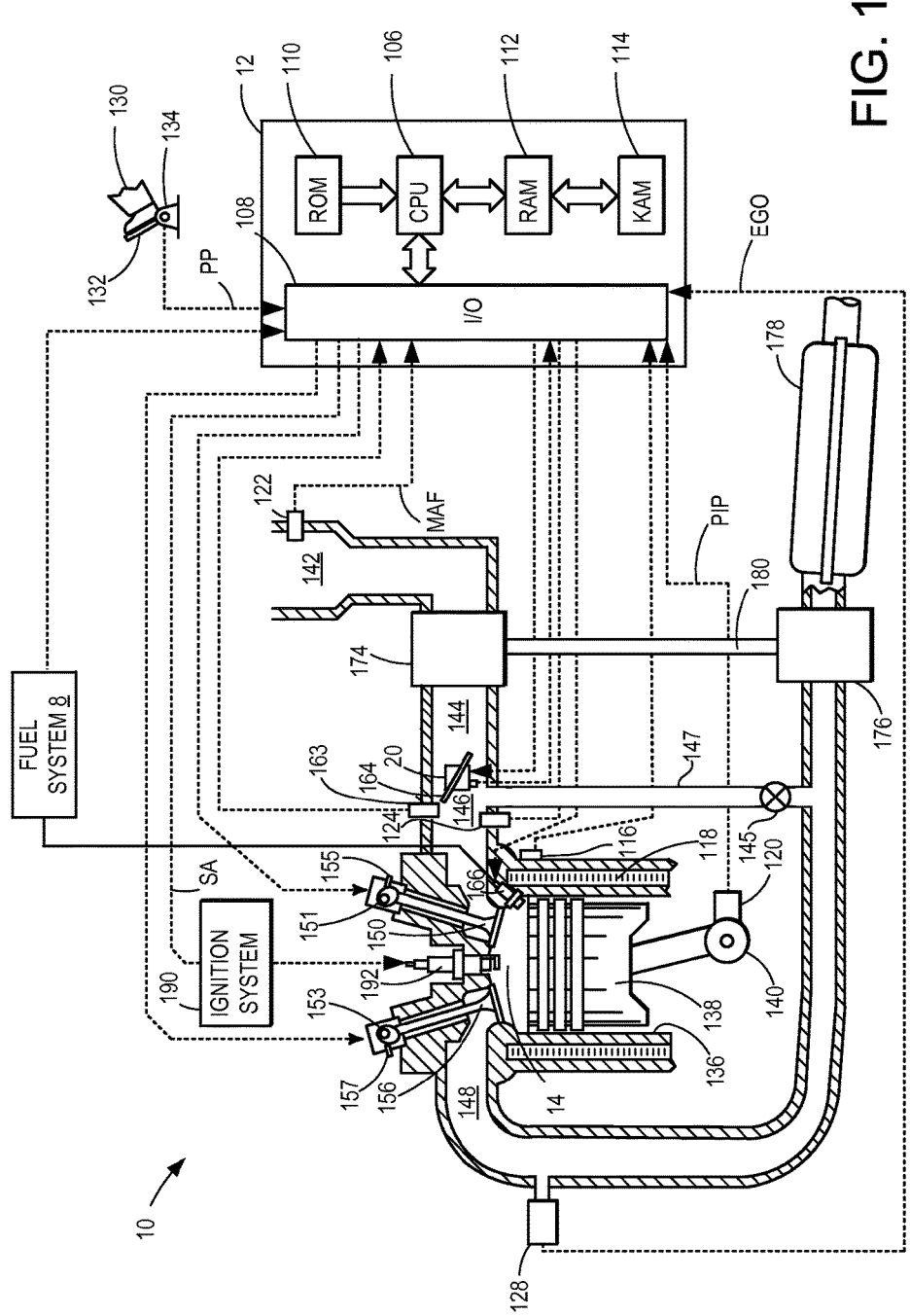
FIG. 1 shows a schematic diagram of one cylinder of an example engine system.
Figure 2:
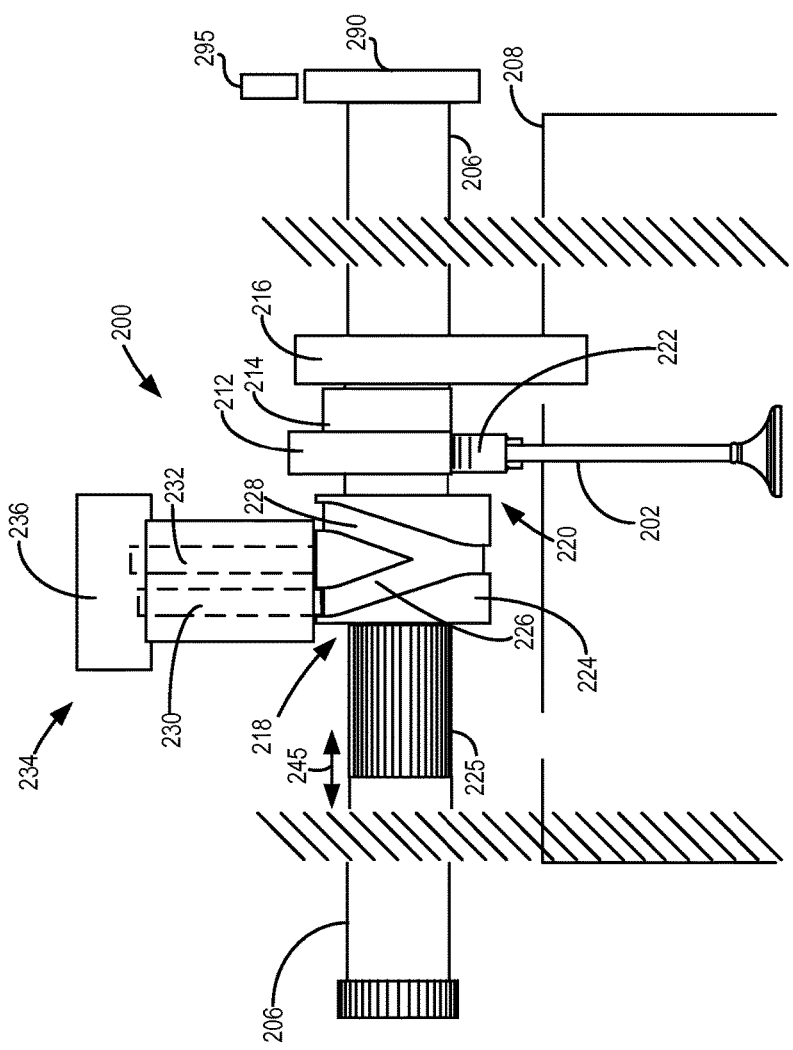
FIG. 2 shows an example cylinder valve activating/deactivating device.
Figure 3:
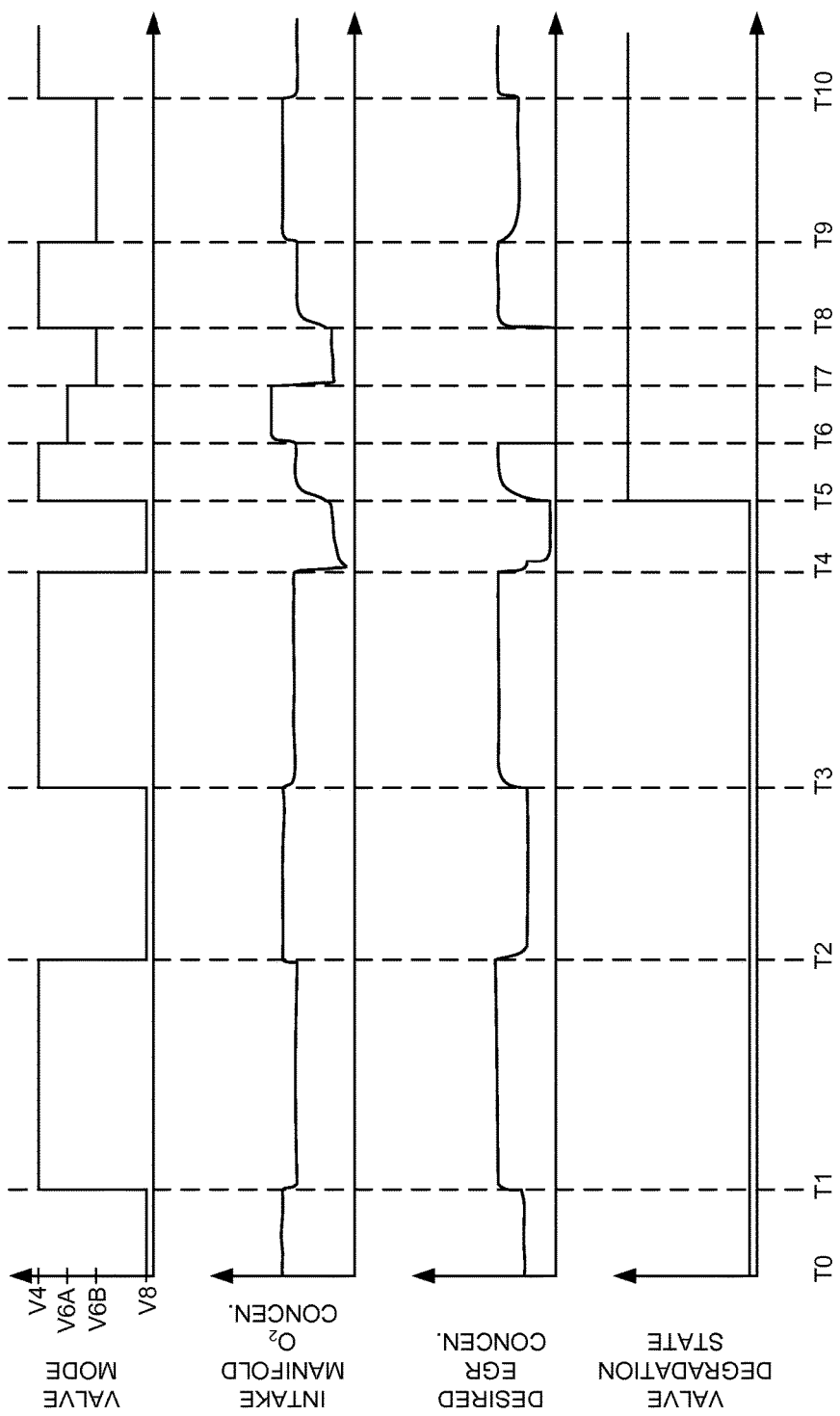
FIG. 3 shows an example engine operating sequence.
Figure 4:
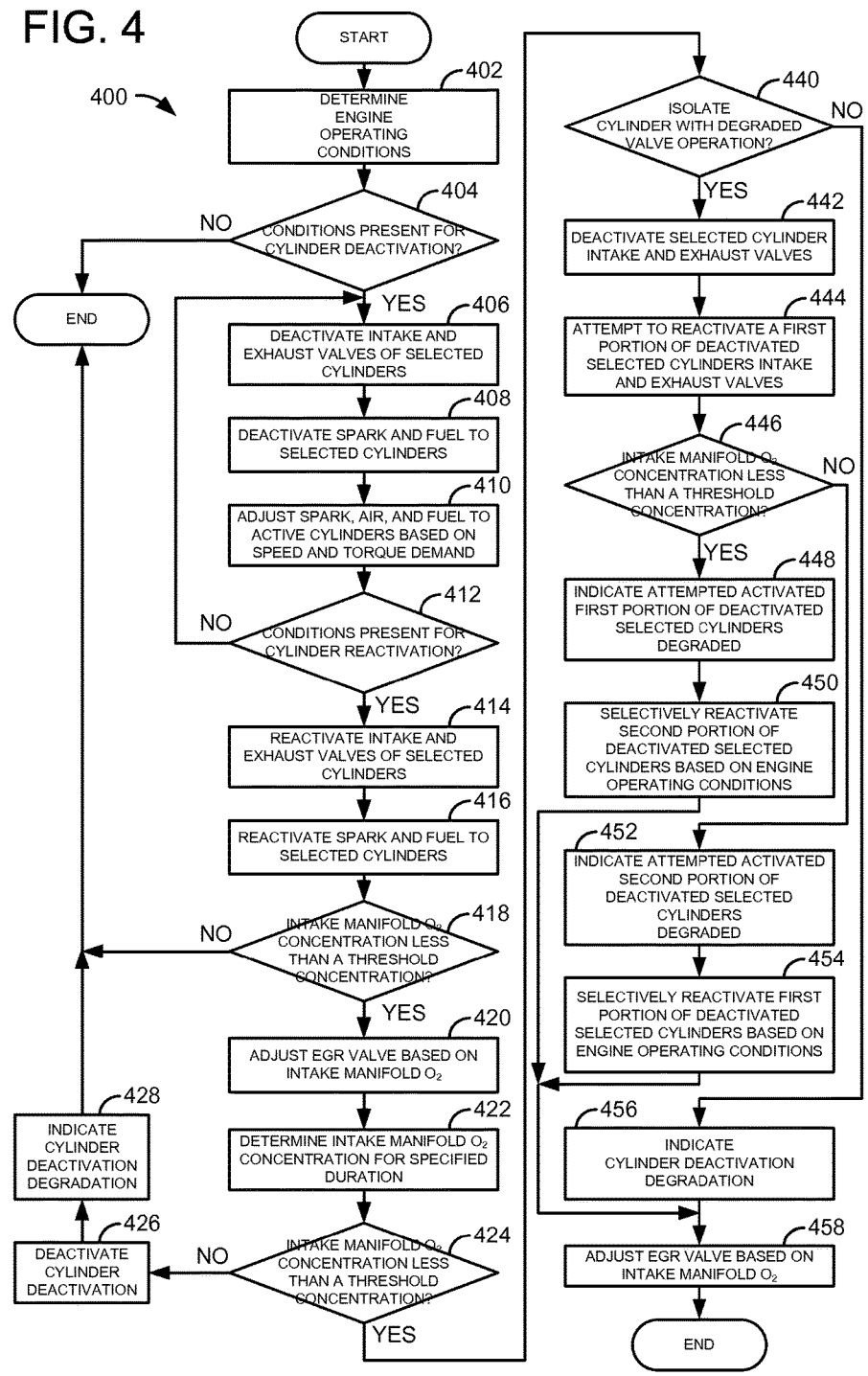
FIG. 4 shows an example method for operating an engine.

The following description relates to systems and methods for determining degradation of a valve operating device. In one example, the valve operating device may be included in an engine system as is shown in FIG. 1. FIG. 2 shows an example valve operating device that selectively activates and deactivates valves. An engine operating sequence is shown in FIG. 3 where engine intake manifold oxygen concentration is a basis for determining exhaust valve degradation. Finally, FIG. 4 shows an example method for operating an engine and determining exhaust valve degradation in response to intake manifold oxygen concentration.

Referring now to FIG. 1, it depicts an example of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of passages 142, 144, and 146. Intake air passage 146 communicates with boost chamber 144, and intake manifold 146. Further, intake passage 146 may communicate with other cylinders of engine 10 in addition to cylinder 14. In some examples, one or more of the intake passages may include a boosting device such as a turbocharger or a supercharger. For example, FIG. 1 shows engine 10 including a turbocharger with a compressor 174 arranged between intake passages 142 and 144, and an exhaust turbine 176 arranged along exhaust passage 148. Compressor 174 may be at least partially powered by exhaust turbine 176 via a shaft 180 where the boosting device is a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174. Additionally, oxygen sensor 163 is shown coupled to intake manifold 146 for determining oxygen concentration in intake manifold 146.

Exhaust passage 148 may receive exhaust gases from other cylinders of engine 10 in addition to cylinder 14. Exhaust gas sensor 128 is shown coupled to exhaust passage 148 upstream of emission control device 178 although in some examples, exhaust gas sensor 128 may be positioned downstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Engine exhaust gas may be recirculated from exhaust passage 148 to intake manifold 146 via exhaust gas recirculation (EGR) valve 145 and EGR passage 147. Exhaust gases returned back to intake manifold 146 may reduce engine output NOx via reducing combustion temperature. Additionally, EGR may reduce engine pumping work via elevating intake manifold pressure. EGR valve 145 may be adjusted to a plurality of positions to provide a varying amount of EGR to the engine.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively.

Cylinder 14 can have a compression ratio, which is the ratio of volumes when piston 138 is at bottom center to top center. Conventionally, the compression ratio is in the range of 9:1 to 12:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some examples, spark plug 192 may be omitted, such as where engine 10 may initiate combustion by auto-ignition or by injection of fuel as may be the case with some diesel engines.

In some examples, each cylinder of engine 10 may include one or more fuel injectors for delivering fuel. As a non-limiting example, cylinder 14 is shown including one fuel injector 166. Fuel injector 166 is shown coupled directly to cylinder 14 for injecting fuel directly therein in proportion to the pulse width received from controller 12. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that, in an alternate example, injector 166 may be a port injector providing fuel into the intake port upstream of cylinder 14. Further, while the example shows fuel injected to the cylinder via a single injector, the engine may alternatively be operated by injecting fuel via multiple injectors, such as one direct injector and one port injector. In such a configuration, the controller may vary a relative amount of injection from each injector.

Fuel may be delivered by the injector to the cylinder during a single cycle of the cylinder. Further, the distribution and/or relative amount of fuel delivered from the injector may vary with operating conditions, such as air charge temperature, as described herein below. Furthermore, for a single combustion event, multiple injections of the delivered fuel may be performed per cycle. The multiple injections may be performed during the compression stroke, intake stroke, or any appropriate combination thereof. It should be understood that the head packaging configurations and methods described herein may be used in engines with any suitable fuel delivery mechanisms or systems, e.g., in carbureted engines or other engines with other fuel delivery systems.

Controller 12 includes read only memory 110, a central processing unit 106, random access memory 112, keep alive memory 114, and inputs and outputs 108. Controller 12 may store executable instructions for the methods described herein in non-transitory memory. Controller 12 also receives input from the various sensors previously mentioned as well as crankshaft position sensor 120 and engine temperature sensor 116. Temperature sensor 116 is shown coupled to coolant jacket 118. Controller 12 also receives input from intake manifold pressure sensor 124 and intake air temperature sensor 122.

During operation, each cylinder within engine 10 typically undergoes a four stroke cycle: the cycle includes the intake stroke, compression stroke, expansion stroke, and exhaust stroke. During the intake stroke, generally, the exhaust valve 156 closes and intake valve 150 opens. Air is introduced into combustion chamber 14 via intake manifold 146, and piston 138 moves to the bottom of the cylinder so as to increase the volume within combustion chamber 14. The position at which piston 138 is near the bottom of the cylinder and at the end of its stroke (e.g. when combustion chamber 14 is at its largest volume) is typically referred to by those of skill in the art as bottom dead center (BDC). During the compression stroke, intake valve 150 and exhaust valve 156 are closed. Piston 138 moves toward the cylinder head so as to compress the air within combustion chamber 14. The point at which piston 138 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion. During the expansion stroke, the expanding gases push piston 138 back to BDC. Crankshaft 140 converts piston movement into a rotational torque of the rotary shaft. Finally, during the exhaust stroke, the exhaust valve 156 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine. As such each cylinder may similarly include its own set of intake/exhaust valves, fuel injector(s), spark plug, etc.

FIG. 2 shows an example cam lobe switching system 200 for application in cam actuator systems 151 and 153 of engine 10 shown in FIG. 1. Cam lobe switching system 200 adjusts a lift and/or valve opening duration of a gas exchange valve 202 in response to engine operating conditions. Camshaft 206 is shown positioned above a cylinder head 208 of an engine cylinder bank. Valve 202 may be an intake valve or an exhaust valve, configured to open and close an intake port or exhaust port in a cylinder, such as cylinder 14 shown in FIG. 1. For example, valve 202 may be actuatable between an open position allowing gas exchange into or out of a cylinder and a closed position substantially blocking gas exchange into or out of the cylinder. It should be understood that though only one valve is shown in FIG. 2; however, engine 10 shown in FIG. 1 may include any number of cylinder valves. For example, engine 10 of FIG. 1 may include any number of cylinders with associated valves and a variety of different cylinder and valve configurations may be used, e.g., V-6, I-4, I-6, V-12, opposed 4, and other engine types.

One or more cam towers or camshaft mounting regions may be coupled to cylinder head 208 to support camshaft 206. For example, cam tower 216 is shown coupled to cylinder head 208 adjacent to valve 202. Though FIG. 2 shows a cam tower coupled to the cylinder head, in other examples, the cam towers may be coupled to other components of an engine, e.g., to a camshaft carrier or the cam cover. The cam towers may support overhead camshafts and may separate the lift mechanisms positioned on the camshafts above each cylinder.

Valve 202 may operate in a plurality of lift and duration modes, e.g., a high valve lift, low or partial valve lift, short opening duration, long opening duration, and zero valve lift. For example, as described in more detail below, by adjusting cylinder cam mechanisms, the valves on one or more cylinders, e.g., valve 202, may be operated in different lift modes based on engine operating conditions.

Camshaft 206, which may be an intake camshaft or an exhaust camshaft, may include a plurality of cams configured to control the opening and closing of the intake valves. For example, FIG. 2 shows a first cam lobe 212 and a second cam lobe 214 positioned above valve 202. The cams lobes may have different shapes and sizes to form lift profiles used to adjust an amount and timing of a lifting of valve 202 while camshaft 206 rotates. For example, cam 212 may be a full lift cam lobe and cam 214 may be a partial lift or low lift cam lobe. Though, FIG. 2 shows two lift profiles associated with first cam 212 and second cam 214, it should be understood that any number of lift profile cams may be present, e.g., three different cam lobes. For example, camshaft 206 may additionally include a zero lift cam used to deactivate valve 202 during certain engine operating conditions.

Valve 202 includes a mechanism 218 coupled to the camshaft above the valve for adjusting an amount of valve lift for that valve and/or for deactivating that valve by changing a location of cam lobes along the camshaft relative to valve 202. For example, the cam lobes 212 and 214 may be slideably attached to the camshaft so that they can slide along the camshaft in an axial direction on a per-cylinder basis. For example, a plurality of cam lobes, e.g., cam lobes 212 and 214, positioned above each cylinder valve, e.g., valve 202, may be slid across the camshaft in directions indicated by arrow 245 to change a cam lobe profile coupled to the valve follower, e.g., follower 220 coupled to valve 202, to change the valve opening and closing durations and lift amounts. The valve cam follower 220 may include a roller finger follower (RFF) 222 which engages with a cam lobe positioned above valve 202. For example, in FIG. 2, roller 222 is shown engaging with full lift cam lobe 212.

Additional follower elements not shown in FIG. 2 may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders may each have only one exhaust valve and/or intake valve, or more than one intake and/or exhaust valves. In still other examples, exhaust valves and intake valves may be actuated by a common camshaft. However, in an alternate example, at least one of the intake valves and/or exhaust valves may be actuated by its own independent camshaft or other device.

An outer sleeve 224 may be coupled to the cam lobes 212 and 214 splined to camshaft 206. Camshaft position relative to the engine crankshaft is determined via rotation sensing camshaft position sensor 295 and camshaft position indicator 290. Camshaft 206 may be coupled with a cam phaser that is used to vary the valve timing with respect to crankshaft position. By engaging a pin, e.g., one of the pins 230 or 232, into a grooved hub in the outer sleeve, the axial position of the sleeve can be repositioned to that a different cam lobe engages the cam follower coupled to valve 202 in order to change the lift of the valve. For example, sleeve 224 may include one or more displacing grooves, e.g., grooves 226 and 228, which extend around an outer circumference of the sleeve. The displacing grooves may have a helical configuration around the outer sleeve and, in some examples, may form a Y-shaped or V-shaped groove in the outer sleeve, where the Y-shaped or V-shaped groove is configured to engage two different actuator pins, e.g., first pin 230 and second pin 232, at different times in order to move the outer sleeve to change a lift profile for valve 202.

Sleeve 224 is shown in a first position while pin 232 shifts sleeve 224 to the left side of FIG. 2. Sleeve 224 follows spline 225 in an axial direction along camshaft 206 when profiles are being switched. Further, a depth of each groove in sleeve 224 may decrease along a length of the groove so that after a pin is deployed into the groove from a home position, the pin is returned to the home position by the decreasing depth of the groove as the sleeve and camshaft rotate.

For example, as shown in FIG. 2, when first pin 230 is deployed into groove 226, outer sleeve 224 will shift in a direction toward cam tower 216 while camshaft 206 rotates thus positioning cam lobe 212 above valve 202 and changing the lift profile. In order to switch back to cam lobe 214, second pin 232 may be deployed into groove 228 which will shift outer sleeve 224 away from cam tower 216 to position cam lobe 214 above valve 202. In some examples, multiple outer sleeves containing lobes may be splined to camshaft 206. For example, outer sleeves may be coupled to cam lobes above every valve in engine 10 or a select number of lobes above the valves.

Actuator pins 230 and 232 are included in a cam lobe switching actuator 234 which adjusts the positions of the pins 230 and 232 in order to switch cam lobes positioned above a valve 202. Cam lobe switching actuator 234 includes an activating mechanism 236, which may be hydraulically powered, or electrically actuated, or combinations thereof. Activating mechanism 236 changes positions of the pins in order to change lift profiles of a valve. For example, activating mechanism 236 may be a coil coupled to both pins 230 and 232 so that when the coil is energized, e.g., via a current supplied thereto from the control system, a force is applied to both pins to deploy both pins toward the sleeve.

Thus, the system of FIG. 2 provides for an engine system, comprising: an engine including an intake manifold; a camshaft including an axially movable sleeve; an oxygen sensor position in the intake manifold; and a controller including executable instructions stored in non-transitory memory for selectively deactivating and reactivating a cylinder via adjusting a position of the axially movable sleeve, the controller including additional executable instructions for adjusting engine operation in response to an oxygen concentration in the intake manifold determined via the oxygen sensor, the oxygen concentration occurring or observed via the oxygen sensor within a predetermined period after adjusting a position of the axially movable sleeve. The engine system includes where the predetermined period is a number of combustion events. The engine system further comprises additional executable instructions for reactivating a portion of a group of deactivated cylinders in response to the intake manifold oxygen concentration. The engine system includes where adjusting engine operation includes adjusting a position of an EGR valve. The engine system includes where adjusting engine operation includes adjusting a position of a camshaft.

Referring now to FIG. 3, an example engine operating sequence is shown. The operating sequence of FIG. 3 may be produced via the system of FIGS. 2 and 3 executing instructions of the method described in FIG. 4. Each plot shown in FIG. 3 occurs at the same time as the other plots in FIG. 3, and vertical markers T0-T10 indicate times of particular interest during the sequence.

The first plot from the top of FIG. 3 represents valve mode versus time. The Y axis represents valve mode. The X axis represents time and time increases from the left side of FIG. 3 to the right side of FIG. 3. In this example, the engine is capable of operating in one of four valve modes at a point in time. The valve modes are indicated along the Y axis and include V8 mode for operating the engine as an eight cylinder engine, V6A mode for operating the engine as a six cylinder engine using a first group of six cylinders, V6B mode for operating the engine as a six cylinder engine using a second group of six cylinders where the second group of six cylinders is different from the first group of six cylinders, and V4 mode for operating the engine as a four cylinder engine.

The second plot from the top of FIG. 3 represents intake manifold oxygen concentration versus time. The Y axis represents oxygen concentration and oxygen concentration increases in the direction of the Y axis arrow. The X axis represents time and time increases from the left hand side of FIG. 3 to the right hand side of FIG. 3.

The third plot from the top of FIG. 3 represents desired EGR concentration versus time. The Y axis represents desired EGR concentration and desired EGR concentration increases in the direction of the Y axis arrow. The X axis represents time and time increases from the left hand side of FIG. 3 to the right hand side of FIG. 3.

The fourth plot from the top of FIG. 3 represents valve degradation state versus time. The Y axis represents valve degradation state and an indication of valve degradation is provided when the valve degradation state trace is at a higher level. Valve degradation is not indicated when the valve degradation state trace is at a lower level. The X axis represents time and time increases from the left hand side of FIG. 3 to the right hand side of FIG. 3.

At time T0, the engine is operating at a constant speed and load. The engine is operating in V8 mode where all engine cylinders are combusting air-fuel mixtures and intake and exhaust valves of all cylinders are opening and closing during an engine cycle. The engine intake manifold oxygen concentration is at a medium level. At this level, a portion of gases inducted into engine cylinders may include fuel vapor from the engine crankcase or a fuel vapor storage canister. The intake manifold may also include some exhaust gases recirculated using an EGR valve or internally via intake and exhaust valve opening overlap. The desired EGR level is at a middle lower level and this level of EGR is provided via recirculating exhaust gas via the EGR valve and intake and exhaust opening time overlap (e.g. internal EGR). The valve degradation state is at a lower level indicating that intake and exhaust valves are operating as desired.

At time T1, the valve mode changes to V4 mode where four engine cylinders are active and where four cylinders are deactivated. The four cylinders are deactivated by holding intake and exhaust valves closed during an engine cycle and ceasing spark and fuel to the four cylinders. The valve mode change may be initiated by a reduction in driver demand torque, engine temperature reaching a threshold temperature, or other changes in engine operation. In one example, the engine firing order is 1, 5, 4, 8, 6, 3, 7, 2 in V8 mode and 1, 4, 6, 7 in V4 mode. The four deactivated engine cylinders are deactivated according to firing order. For example, cylinder three may be the first cylinder deactivated followed sequentially by cylinders two, five, and eight. The intake manifold oxygen concentration is shown decreasing a small amount in response to the increasing desired EGR concentration. The desired EGR concentration increases in response to engine speed and load of the active cylinders. The EGR valve opening amount may be increased so that the actual EGR concentration is increased in response to the increasing desired EGR concentration. The valve degradation state remains at a lower level indicating that the intake and exhaust valves are operating as is desired.

At time T2, the valve mode changes back to V8 mode in response to operating conditions. For example, the valve mode may change to V8 mode in response to an increase in driver demand torque or a change in engine speed. The desired EGR concentration is reduced in response to engine speed and the load of active cylinders. In one example, cylinder load may be described as a cylinder air amount divided by the theoretical amount of air that may enter the cylinder. The intake manifold oxygen concentration is increased a small amount in response to the decrease in desired EGR concentration. The EGR valve opening amount may be decreased to reduce the actual EGR concentration in response to the desired EGR concentration. The valve degradation state remains at a lower level indicating that the intake and exhaust valves are operating as is desired.

At time T3, the valve mode is switched to V4 mode again in response to a change in engine operating conditions. The desired EGR concentration is increased in response to a change in load of the active cylinders and the intake manifold oxygen concentration is decreased a small amount as the desire EGR concentration is increased. The valve degradation state remains at a lower level indicating that the intake and exhaust valves are operating as is desired.

At time T4, the valve mode is switched back to V8 mode and the desired EGR concentration is initially reduced to a middle level in response to engine speed and load of the active cylinders. The intake manifold oxygen concentration is reduced to a low level in response to the change in valve mode and the reduction of desired EGR. The intake manifold oxygen concentration level in this example is reduced to a low level in response to exhaust valves of a cylinder not opening during an exhaust stroke after being commanded to activate. Combusted gases exit the cylinder to the intake manifold when the intake valves open, thereby reducing intake manifold oxygen concentration and increasing the actual EGR concentration (not shown). The desired EGR concentration is reduce further shortly after time T4 in response to the low intake manifold oxygen concentration so that the possibility of misfires in other engine cylinders may be reduced. The EGR valve opening amount (not shown) is decreased in response to the reduced desired EGR concentration. The valve mode remains in V8 mode for a predetermined duration so that it may be determined if the valve state transition is slow or not happening. The valve degradation state remains at a lower level while it is determined if the valve mode change is slow or not happening. In some examples, the valve degradation state may be asserted as soon as the intake oxygen concentration is reduced to a threshold level.

At time T5, the predetermined duration for transitioning to V8 mode has been exceeded and the valve degradation state is transitioned to a higher level to assert that valve degradation is present. The valve mode is also transitioned to V4 mode in response to valve degradation. Valve degradation is determined via the intake manifold oxygen concentration being lower than a threshold level. The desired EGR concentration is increased in response to the valve mode changing to V4 mode and the intake manifold oxygen concentration increases in response to the valve mode changing to V4 mode where gas in deactivated cylinders may be held within the deactivated cylinders.

At time T6, the valve mode is changed to V6A mode so that it may be determined which group of two deactivated cylinders includes a cylinder with valve degradation. In this example, cylinders 1, 5, 4, 6, 3, 7 may be activated in V6A mode; however, two other deactivated cylinders may be temporarily activated to determine which cylinder is exhibiting valve degradation. Cylinders five and three are activated by commanding intake and exhaust valves of cylinders five and three to operate and via supplying spark and fuel. Cylinders two and eight remain deactivated. It should be noted that the engine firing order in V6A and/or V6B mode may be uneven so it may be desirable to limit the amount of time the engine is operated in either mode. The desired EGR concentration is transitioned to a low level so that EGR flow through the EGR valve is stopped in response to the engine operating in V6A mode. The intake manifold oxygen concentration is shown increasing in response to the engine changing to V6A mode and the reduction in desired EGR. It may be determined that valves in cylinders five and three are operating as desired since the intake manifold oxygen concentration increases in response to operating in V6A mode. The valve degradation state remains at a higher level to indicate that valve degradation remains present.

At time T7, the valve mode is transitioned from V6A mode to V6B mode. In V6B mode intake and exhaust valves of cylinders 1, 4, 8, 6, 8, 7, 2 are activated and fuel and spark are provided to the cylinders. The desired EGR concentration remains at a low level and the valve degradation state remains asserted. The intake manifold oxygen concentration is reduced to a low level indicating that either cylinder two or eight includes degraded exhaust valves. In one example, valve degradation is attributed to cylinders two and eight for diagnostic purposes. Further, the valve mode V6B may be deactivated based on the oxygen concentration being low during V6B valve mode. The engine may be operated in V6B mode for a predetermined duration to establish that valve degradation is present in V6B mode.

At time T8, the valve mode is transitioned back to V4 mode and the engine is operated as a four cylinder engine in response to intake manifold oxygen concentration and the valve mode being in V6B mode for a predetermined duration. The desired EGR concentration is increased in response to operating the engine in V4 mode. The engine operates in V4 mode to reduce the possibility of engine misfire and cylinder firing imbalance. Since it is determined that the engine operates without valve degradation in V6A mode, the engine may be operated in V6A mode to increase engine output in response to increasing or high driver demand torque. However, the amount of time the engine operates in V6A mode may be limited to reduce the possibility of degradation from operating with an uneven firing order. The valve degradation state remains at a higher level to show valve degradation is present.

At time T9, the engine is operated in V6A mode in response to an increasing or high driver demand torque. The desired EGR concentration is decreased in response to engine speed and the load of active cylinders. The intake manifold oxygen concentration is increased in response to the reduced EGR concentration.

At time T10 the engine is transitioned back to operating in V4 valve mode. The engine may transition to V4 mode in response to a reduction in driver demand torque or in response to operating the engine in V6A mode for a predetermined duration.

In this way, valve degradation may be determined in response to intake manifold oxygen concentration. Further, cylinders having degraded valve operation may be distinguished from cylinders that operate as desired. Additionally, engine performance may be increased in response to driver demand torque or other conditions by selectively operating the engine in an alternative valve mode where valve degradation is determined not to be present.

Referring now to FIG. 4, a method for determining valve degradation via intake manifold oxygen concentration is described. The method of FIG. 4 may be stored in non-transitory memory as executable instructions in a system as shown in FIGS. 1 and 2.

At 402, method 400 determines engine operating conditions. Engine operating conditions may include but are not limited to engine speed, engine load, engine temperature, vehicle speed, intake manifold oxygen concentration, and transmission gear. Method 400 proceeds to 404 after engine operating conditions are determined.

At 404, method 400 judges whether or not conditions are present for cylinder deactivation. Selected cylinders of an engine may be deactivated in response to engine speed and driver demand torque, engine temperature, and vehicle speed. If predetermined conditions are present (e.g., engine speed less than a threshold speed and driver demand torque less than a threshold driver demand torque) for cylinder deactivation, the answer is yes and method 400 proceeds to 406. Otherwise, the answer is no and method 400 proceeds to exit.

At 406, method 400 deactivates selected cylinders via holding intake and exhaust valves closed during a cylinder cycle. In one example, four cylinders of an eight cylinder engine are deactivated. The engine cylinders are deactivated sequentially in order of engine combustion timing. The intake and exhaust valves may be deactivated via an actuator as is shown in FIG. 2 or via a different type of valve actuator. In other examples, a group of cylinders of an engine having fewer than eight cylinders may be deactivated. For example, two of four cylinders may be deactivated. Method 400 proceeds to 408 after selected intake and exhaust valves are deactivated.

At 408, method 400 deactivates spark and fuel to the cylinders that have deactivated intake and exhaust valves. Spark may be deactivated via stopping ignition coil charging. Fuel may be deactivated by not opening fuel injectors. Method 400 proceeds to 410 after spark and fuel supplied to cylinders with deactivated valves is ceased.

At 410, method 400 adjusts spark timing, cylinder air amount, and fuel amount to cylinders that are active so as to maintain engine torque at a level it was at before the engine is transitioned to cylinder deactivation mode. The spark timing is adjusted based on cylinder load and cylinder air amount and fuel amount are adjusted based on engine speed and driver demand torque. Method 400 proceeds to 412 after spark timing, cylinder air amount, and cylinder fuel amount are adjusted.

At 412, method 400 judges whether or not conditions are present to reactivate the deactivated cylinders. In one example, cylinders may be reactivated in response to engine speed and driver demand torque (e.g., torque requested by a driver via an accelerator pedal). For example, deactivated engine cylinders may be reactivated in response to an increasing driver demand torque. If method 400 judges that conditions are present to reactivate engine cylinders, the answer is yes and method 400 proceeds to 414. Otherwise, the answer is no and method 400 returns to 406.

At 414, method 400 reactivates the deactivated cylinders via commanding the intake and exhaust valves to open and close during a cylinder cycle. Combustion in the cylinders is reestablished when the cylinders are reactivated. The valves of four cylinders are reactivated in this example, but a different number of cylinders may be reactivated in other examples. The engine cylinders are reactivated sequentially in order of engine combustion timing. The intake and exhaust valves may be reactivated via an actuator as is shown in FIG. 2 or via a different type of valve actuator. Method 400 proceeds to 416 after intake and exhaust valves are reactivated.

At 416, method 400 reactivates spark and fuel to the cylinders that have been deactivated. Spark may be reactivated via starting ignition coil charging. Fuel may be reactivated by opening fuel injectors. Method 400 proceeds to 418 after spark and fuel are supplied to cylinders.

At 418, method 400 judges whether or not intake manifold oxygen concentration is less than a threshold oxygen concentration. In one example, the threshold oxygen concentration is an oxygen concentration that is present when EGR, carbon canister stored gases, and crankcase gases are supplied to the engine intake manifold. Thus, even if EGR, carbon canister gases, and crankcase gases are present in the engine intake manifold and reduce intake manifold oxygen concentration, it may be determined from intake manifold oxygen concentration that exhaust valves of a cylinder are not operating as is desired. The EGR, carbon canister gases, and crankcase gases may be in amounts that are based on engine speed and load. If method 400 judges that intake manifold oxygen concentration is less than a threshold oxygen concentration, the answer is yes and method 400 proceeds to 420. Otherwise, the answer is no and method 400 returns to exit.

At 420, method 400 adjusts a position of the EGR valve in response to intake manifold oxygen concentration. In one example, the EGR valve position is adjusted to provide a desired intake manifold oxygen concentration that is related to an EGR concentration or amount. The intake manifold oxygen concentration relationship to EGR concentration may be empirically determined and stored in memory or it may be based on a model. For example, if intake oxygen concentration is determined via an oxygen sensor to be less than a desired intake oxygen concentration, an EGR valve is adjusted (e.g., closed) to drive intake manifold oxygen concentration to a higher level (e.g., the desired intake manifold oxygen concentration). Alternatively, or in addition, intake and exhaust valve timing of active cylinders may be adjusted via adjusting cam timing relative to the engine crankshaft to reduce intake and exhaust valve opening time overlap to reduce internal EGR. In other examples, the EGR valve and cam timing are not adjusted for a predetermined amount of time to provide stronger confirmation of valve degradation. Method 400 proceeds to 422.

Additionally, in some examples, an engine throttle opening amount may be increased and spark timing may be retarded in response to intake manifold oxygen concentration so that cylinder EGR dilution is reduced while engine torque is maintained. In other words, if excess exhaust is ejected to the engine intake manifold from a cylinder having degraded exhaust valve operation, EGR charge dilution of other cylinders may be reduced via increasing the engine air amount. If the EGR is relatively hot, retarding spark timing adjusts reduces the possibility of knock and engine torque is adjusted to the desired engine torque even though the engine air amount is increased. Such compensation may be provided when closing the EGR valve does not increase the engine intake manifold oxygen concentration to a desired level. On the other hand, if the combusted gases in a cylinder are sufficiently cooled (e.g., by holding the combusted gases in the cylinder or other means), the spark timing may be advanced while the throttle is held to maintain engine air flow so that slower combustion rates may be compensated.

At 422, method 400 determines manifold oxygen concentration for a predetermined duration. The predetermined duration may be a number of engine combustion events or an amount if time. Method 400 proceeds to 424 after intake manifold oxygen concentration is determined for a predetermined amount of time.

At 424, judges whether or not intake manifold oxygen concentration is less than a threshold oxygen concentration. If method 400 judges that intake manifold oxygen concentration is less than the threshold oxygen concentration, the answer is yes and method 400 proceeds to 440. Otherwise, the answer is no and method 400 proceeds to 426.

At 426, method 400 deactivates cylinder deactivation based on a determination that valve reactivation is slower than desired. Valve reactivation may be slower than is desired due to an actuator that responds intermittently or slower than desired. Thus, all engine cylinders remain active until it is determined that slow valve reactivation has been overcome. Method 400 proceeds to 428 after cylinder deactivation is deactivated.

At 428, method 400 indicates cylinder valve degradation and/or cylinder deactivation degradation. In one example, method 400 sets a bit in memory to indicate cylinder valve degradation. Method 400 proceeds to exit after cylinder valve degradation has been indicated.

At 440, method 400 judges whether or not to isolate and determine which of deactivated cylinders has degraded valve operation. In one example, method 400 may judge whether or not to determine which of the deactivated cylinders has degraded valve operation based on the number of engine cylinders and the number of deactivated cylinders. For example, if the engine has eight cylinders and four cylinders are deactivated, method 400 isolates which of the four cylinders have degraded valve operation. On the other hand, if the engine has two cylinders and one cylinder is deactivated, method 400 judges not to isolate the degraded cylinder. If method 400 judges to isolate deactivated cylinders to determine which cylinders have degraded valves, the answer is yes and method 400 proceeds to 442. Otherwise, the answer is no and method 400 proceeds to 456.

At 456, method 400 indicates cylinder valve degradation. Cylinder valve degradation may be indicated by setting a bit in controller memory, illuminating a light, or providing an indication of degradation via an error message on a display. Additionally, cylinder deactivation degradation may be indicated in a similar manner. Method 400 proceeds to 458 after valve degradation is indicated.

At 442, method 400 commands the same cylinders that were deactivated at 406 to be deactivated again by closing intake and exhaust valves of the cylinders for more than an engine cycle. Method 400 proceeds to 444 after intake and exhaust valves of cylinders to be deactivated are commanded closed.

At 444, method 400 commands a group of the deactivated cylinders to be reactivated. For example, if four cylinders are deactivated, two of the four cylinders are commanded to be reactivated. The cylinders commanded to be reactivated may be based on which cylinders allow the engine to operate with as close to an even firing order as is possible. Intake and exhaust valves of the group of cylinders being reactivated are commanded to operate and method 400 proceeds to 446. Additionally, the EGR valve may be closed and internal EGR may be reduced at 444.

At 446, method 400 judges whether or not intake manifold oxygen concentration is less than a threshold oxygen concentration. The threshold oxygen may be an oxygen concentration less than that which is present when EGR, carbon canister stored gases, and crankcase gases are supplied to the engine intake manifold. If intake manifold oxygen concentration is less than the desired engine intake oxygen concentration, the answer is yes and method 400 proceeds to 448. Otherwise, the answer is no and method 400 proceeds to 452.

At 448, method 400 indicates that a first group of deactivated cylinders that were commanded to be activated 444 includes degraded cylinder valve operation. In particular, the first group of cylinders includes degraded exhaust valve operation since closed exhaust valves may cause a combusted air-fuel mixture to be ejected into the engine intake manifold, thereby reducing the intake manifold oxygen concentration. In other words, a first portion of cylinders of the total number of deactivated cylinders include degraded cylinder valve operation. The first portion of cylinders is indicated to include degraded cylinder valve operation via setting a memory bit and or providing an indication to the driver. Method 400 proceeds to 450 after cylinder valve degradation is indicated.

At 450, the remaining cylinders of the total number of deactivated cylinders that are not included in the first portion of cylinders may be selectively reactivated to increase engine torque capacity. However, the duration that the remaining cylinders are activated may be limited so that an uneven engine firing order may not degrade the engine. In one example, the remaining cylinders may be reactivated only when driver demand torque is greater than a threshold driver demand torque. In another example, the remaining cylinders may only be reactivated when the driver demand torque is requesting maximum driver demand torque. Method 400 proceeds to 458 after selective reactivation of deactivated cylinders is enabled.

At 452, method 400 indicates that the group of deactivated cylinders that were commanded to be activated 444 includes degraded cylinder valve operation. In particular, the second group of cylinders includes degraded exhaust valve operation since closed exhaust valves may cause a combusted air-fuel mixture to be ejected into the engine intake manifold, thereby reducing the intake manifold oxygen concentration. In other words, a second portion of cylinders of the total number of deactivated cylinders include degraded cylinder valve operation. The second portion of cylinders is indicated to include degraded cylinder valve operation via setting a memory bit and or providing an indication to the driver. Method 400 proceeds to 454 after cylinder valve degradation is indicated.

At 454, the remaining cylinders of the total number of deactivated cylinders that are not included in the second portion of cylinders may be selectively reactivated to increase engine torque capacity (e.g., the first portion of cylinders). However, the duration that the remaining cylinders are activated may be limited so that an uneven engine firing order may not degrade the engine. In one example, the remaining cylinders may be reactivated only when driver demand torque is greater than a threshold driver demand torque. In another example, the remaining cylinders may only be reactivated when the driver demand torque is requesting maximum driver demand torque. Method 400 proceeds to 458 after selective reactivation of deactivated cylinders is enabled.

Although method 400 isolates and verifies valve operation in two groups of cylinders, in other examples, method 400 may selectively reactivate each of the deactivated cylinders at different times and to determine if the individual cylinders have valve operation degradation based on intake manifold oxygen concentration being less than a threshold oxygen concentration. Additionally, although method 400 bases finding valve degradation for two groups of cylinders based on intake manifold when only one of the two groups of cylinders is commanded active, in other examples method 400 verifies valve operation by activating each group of cylinders and comparing intake manifold oxygen concentration against a threshold intake manifold oxygen concentration.

At 458, method 400 adjusts a position of the EGR valve in response to intake manifold oxygen concentration. For example, the EGR valve position is adjusted to provide a desired intake manifold oxygen concentration that is related to an EGR concentration or amount. The intake manifold oxygen concentration relationship to EGR concentration may be empirically determined and stored in memory or it may be based on a model. If intake oxygen concentration is determined via an oxygen sensor to be less than a desired intake oxygen concentration, an EGR valve position is adjusted (e.g., closed) to drive intake manifold oxygen concentration to a higher level (e.g., the desired intake manifold oxygen concentration). Alternatively, or in addition, intake and exhaust valve timing of active cylinders may be adjusted via adjusting cam timing relative to the engine crankshaft to reduce intake and exhaust valve opening time overlap to reduce internal EGR. In other examples, the EGR valve and cam timing are not adjusted for a predetermined amount of time to provide stronger confirmation of valve degradation. Method 400 proceeds to exit after EGR is adjusted.

Thus, the method of FIG. 4 provides for an engine operating method, comprising: commanding reactivation of a cylinder that is deactivated; and adjusting engine operation in response to an oxygen concentration in an engine intake manifold being less than a threshold oxygen concentration, the oxygen concentration present within a predetermined duration after commanding reactivation of the cylinder. The method includes where adjusting engine operation includes ceasing fuel flow to a cylinder in response to the oxygen concentration. The method includes where adjusting engine operation includes ceasing spark to a cylinder in response to the oxygen concentration. The method includes where adjusting engine operation includes commanding deactivation of the cylinder in response to the oxygen concentration. In some examples, the method includes where adjusting engine operation includes increasing a throttle opening amount and retarding spark timing of active cylinders in response to the oxygen concentration while all engine cylinders are commanded to an active state. The method includes where exhaust valves of the cylinder are held closed for an engine cycle when the cylinder is deactivated.

In another example, the method of FIG. 4 provides for an engine operating method, comprising: commanding reactivation of a cylinder that is deactivated; and adjusting a position of an EGR valve in response to an oxygen concentration in an engine intake manifold being less than a threshold oxygen concentration, the oxygen concentration present within a predetermined duration after commanding reactivation of the cylinder. Additionally, intake valve opening time and exhaust valve opening time may be adjusted to reduce intake and exhaust valve opening time overlap in response to intake oxygen concentration being less than a threshold concentration. The method further comprises adjusting the position of the EGR valve to provide a desired EGR amount based on the oxygen concentration in the intake manifold. The method further comprises adjusting a position of a cam based on the oxygen concentration in the intake manifold. The method includes where the cylinder is deactivated via holding an exhaust valve in a closed position over an engine cycle.

In another example, the method further comprises combusting an air-fuel mixture in the cylinder after commanding reactivation of the cylinder. The method further comprises providing a plurality of combustion events in the cylinder after commanding reactivation of the cylinder. The method includes where the position of the EGR valve is further adjusted in response to engine speed and requested torque. The method further comprises indicating exhaust valve degradation in response to the oxygen concentration in the engine intake manifold.

It will be appreciated that the configurations and methods disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. An engine operating method, comprising:
commanding reactivation of a cylinder that is deactivated; and
indicating cylinder exhaust valve degradation in response to an oxygen concentration in an engine intake manifold being less than a threshold oxygen concentration, the oxygen concentration present within a predetermined duration after commanding reactivation of the cylinder; and
adjusting engine operation in response to the indicating of the cylinder exhaust valve degradation.

2. The method of claim 1, where adjusting engine operation includes ceasing fuel flow to a cylinder in response to the oxygen concentration, and further comprising, prior to commanding reactivation of the cylinder that is deactivated, deactivating the cylinder and maintaining engine torque by adjusting one or more of spark timing, cylinder air amount, and fuel amount to one or more active cylinders.

3. The method of claim 1, where adjusting engine operation includes ceasing spark to a cylinder in response to the oxygen concentration, and further comprising determining exhaust valve degradation for the cylinder, the cylinder in a group of cylinders that includes the cylinder, via activating one or more cylinders of the group of cylinders and based on the oxygen concentration in the engine intake manifold.

4. The method of claim 1, where adjusting engine operation includes commanding deactivation of the cylinder in response to the oxygen concentration, and further comprising adjusting cam timing in response to cylinder exhaust valve degradation.

5. The method of claim 1, where adjusting engine operation includes increasing a throttle opening amount and retarding spark timing of active cylinders in response to the oxygen concentration while all engine cylinders are commanded to an active state.

6. The method of claim 1, where exhaust valves of the cylinder are held closed for an engine cycle when the cylinder is deactivated, and further comprising deactivating cylinder deactivation in response to the oxygen concentration in the engine intake manifold not being less than the threshold oxygen concentration after the predetermined duration has elapsed.

7. An engine operating method, comprising:
commanding reactivation of a cylinder that is deactivated; and
indicating cylinder exhaust valve degradation in response to an oxygen concentration in an engine intake manifold being less than a threshold oxygen concentration, the oxygen concentration present within a predetermined duration after commanding reactivation of the cylinder; and
adjusting a position of an EGR valve in response to the indicating of the cylinder exhaust valve degradation.

8. The method of claim 7, further comprising adjusting the position of the EGR valve to provide a desired EGR amount based on the oxygen concentration in the engine intake manifold, and further comprising deactivating cylinder deactivation in response to the oxygen concentration in the engine intake manifold not being less than the threshold oxygen concentration after the predetermined duration has elapsed.

9. The method of claim 7, further comprising adjusting a position of a cam based on the oxygen concentration in the engine intake manifold.

10. The method of claim 7, where the cylinder is deactivated via holding an exhaust valve in a closed position over an engine cycle.

11. The method of claim 7, further comprising combusting an air-fuel mixture in the cylinder after commanding reactivation of the cylinder, and further comprising isolating operation of the cylinder from operation of other cylinders that were commanded to be deactivated by reactivating a portion of cylinders that were commanded to be deactivated.

12. The method of claim 7, further comprising providing a plurality of combustion events in the cylinder after commanding reactivation of the cylinder.

13. The method of claim 7, where the position of the EGR valve is further adjusted in response to engine speed and requested torque.

14. The method of claim 7, further comprising indicating that the cylinder exhaust valve degradation includes cylinder deactivation degradation in response to the oxygen concentration in the engine intake manifold increasing to or above the threshold oxygen concentration after the predetermined duration has elapsed.

15. An engine system, comprising:
an engine including an intake manifold;
a camshaft including an axially movable sleeve;
an oxygen sensor positioned in the intake manifold; and
a controller including executable instructions stored in non-transitory memory for selectively deactivating and reactivating a cylinder via adjusting a position of the axially movable sleeve, the controller including additional executable instructions for indicating cylinder exhaust valve degradation in response to an oxygen concentration in the intake manifold determined via the oxygen sensor, the oxygen concentration occurring within a predetermined period after adjusting the position of the axially movable sleeve, and further including executable instructions for adjusting engine operation in response to the indicating of the cylinder exhaust valve degradation.

16. The engine system of claim 15, where the predetermined period is a number of combustion events, and further comprising additional executable instructions to adjust cam timing in response to the indicating of the cylinder exhaust valve degradation.

17. The engine system of claim 15, further comprising additional executable instructions for reactivating a portion of a group of deactivated cylinders in response to the oxygen concentration in the intake manifold.

18. The engine system of claim 15, where adjusting engine operation includes adjusting a position of an EGR valve, and further comprising additional executable instructions to deactivate cylinder deactivation in response to the oxygen concentration in the intake manifold not being less than a threshold oxygen concentration after determining the oxygen concentration in the intake manifold for a predetermined duration after commanding reactivation of the cylinder.

19. The engine system of claim 15, where adjusting engine operation includes adjusting a position of a camshaft.

20. The engine system of claim 15, further comprising isolating operation of the cylinder from operation of other cylinders that were commanded to be deactivated by reactivating a portion of cylinders that were commanded to be deactivated to diagnose degradation of the cylinder.

* * * * *